May 12, 1925.  
V. L. SCHENK  
VALVE ATTACHMENT  
Filed Feb. 25, 1924  
1,537,555

Vincent Leo Schenk, Inventor

By Byrnes, Townsend & Bickenstein,
Attorneys.

Patented May 12, 1925.

1,537,555

UNITED STATES PATENT OFFICE.

VINCENT LEO SCHENK, OF ST. JOSEPH, MISSOURI.

VALVE ATTACHMENT.

Application filed February 25, 1924. Serial No. 695,035.

*To all whom it may concern:*

Be it known that I, VINCENT LEO SCHENK, a citizen of the United States, residing at St. Joseph, in the county of Buchanan and State of Missouri, have invented certain new and useful Improvements in Valve Attachments, of which the following is a specification.

The invention relates to a spring seat for valves of the type commonly employed on internal combustion engines. As is well known, the stems of such valves are provided with a seat or washer for receiving the spring which tends to reseat the valve. Since the valves cannot be inspected or ground without first releasing the valve from the tension of the spring it is desirable that the valve stem and spring seat be so constructed that the seat may be readily removed from the valve stem.

An object of the invention is to provide a spring seat attachment which may be easily attached to or removed from a valve stem, and which when in operative position, transmits the spring pressure to the valve stem through a solid and non-yielding connection. More specifically, an object is to provide a valve attachment in which thrust members are yieldingly urged towards operative position by an auxiliary spring or the like, but in which no part of the valve closing pressure is transmitted through a yielding or flexible member.

These and other objects of my invention may be attained by the embodiment illustrated in the accompanying drawings in which—

Figure 1:
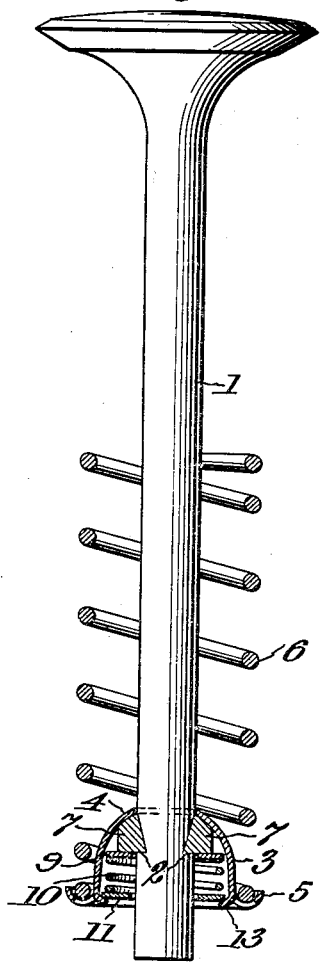
Fig. 1, is an elevation of a notched valve stem upon which is shown the novel attachment, the latter being in vertical section.
Figure 2:
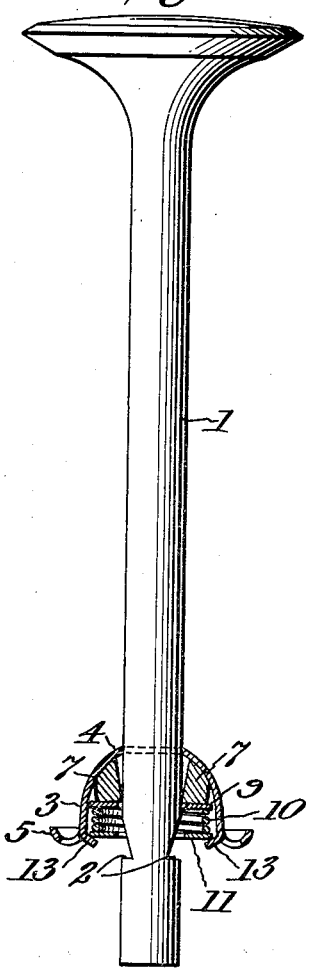
Fig. 2, is a similar view, the spring seat being shown moved out of operative relation with respect to the notches of the valve stem.
Figure 3:
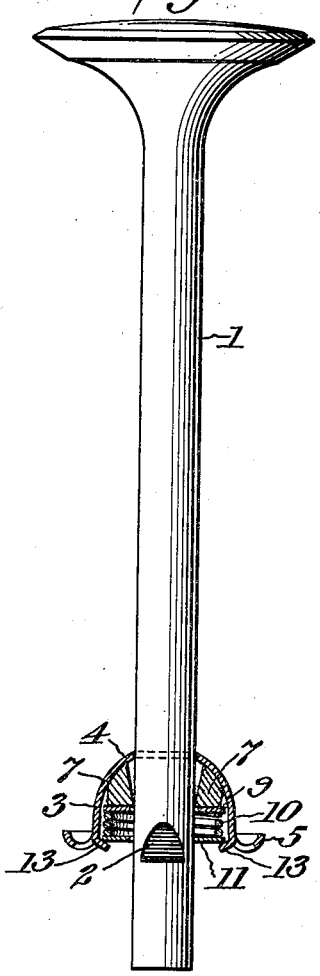
Fig. 3 is a view similar to Fig. 2, but with the valve stem turned through a quarter revolution upon its own axis.

In the drawings, the cylindrical valve stem which is indicated by the numeral 1 is shown as provided with two diametrically opposed notches 2, which preferably have bottom walls at right angles to the axis of the stem. The spring seat or washer comprises a hollow body or shell 3 having an apertured thrust wall 4 through which the stem may pass and a reversely directed flange 5 for receiving the valve spring 6.

The two members 7 are of identical construction and are designed to transmit the spring pressure from the shell to the valve stem. For convenience of description, the two members may be considered as forming a split tube, each of the complementary parts having an end conforming to the shape of the inner surface of the thrust wall of the shell and having a lug 8 which projects into the bore formed by the opposed faces of the two members. The lugs 8 are preferably of the shape and size of the notches formed in the stem and the lugs and end surfaces are so arranged that the spherical thrust surfaces of the shell and members 7 are in close engagement when the lugs are seated within the notches.

The thrust members 7 rest upon a washer 9 which is pressed towards the domed end of the shell 3 by a spring 10. The spring 10, in turn, engages a washer 11 preferably having peripheral lugs 12, and which is held within the shell 3 by suitable means, such as projections 13 stamped from the metal of the shell.

When the spring seat and stem are so positioned that the projections 8 of the thrust members are not in vertical alignment with the notches on the stem, the spring seat may be placed on or removed from the stem. Upon rotating the stem or the spring seat through ninety degrees, however, the projections 8 will engage in the notches 2 as the spring seat is slid over the stem. Since the contacting surfaces of the shell and the thrust members are spherical, there may be considerable relative movement of the stem, spring and shell without disturbing the perfect engagement of the projections 8 and notches 2.

While it is not essential, it is preferred that the cylindrical bore formed between the two thrust members should be of such size as to snugly receive the stem 1 when the lugs 8 are positioned within the notches 2. When the parts are proportioned in this manner, the spring seat acts as an integral part of the valve stem as the rigid parts are locked in position by the pressure of the spring 6.

Figure 4:
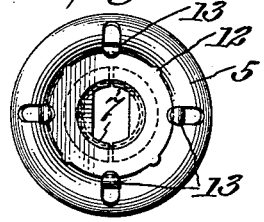
Fig. 4 is a plan view of the spring seat as viewed from below Fig. 1.
Figure 5:
Fig. 5 is a perspective view of the thrust members of the attachment.
Figure 6:
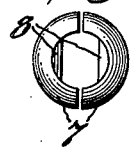
Fig. 6 is a plan view of the same as viewed from their spherical ends.

It is to be noted that the pressure of spring 6 is transmitted through rigid members and that the sole function of the spring 10 is to urge the thrust members into locking position as shown in Figs. 1, 4 and 6.

While I prefer to form the contacting surfaces of the thrust wall and thrust members as spherical surfaces, it will be apparent that other curvatures may be employed so long as the surfaces are so shaped that the thrust wall 4 must be moved further from the notches 2 before the thrust members can be shifted to clear the lugs 8 from the notches.

It will be understood that the invention is not limited to the specific embodiment herein shown and described since various changes may be made in the several parts, their relative size, shape and location without departing from the spirit of my invention as expressed in the following claims.

I claim:

1. An attachment for use on a notched valve stem, said attachment comprising a body having a flange and a thrust wall, said flange and wall being adapted to receive and to transmit, respectively, the pressure of a valve spring, and a rigid thrust member carried by said body and movable into position between said thrust wall and the notch-forming surfaces of the valve stem, said thrust member having an irregular surface substantially conforming to the shape of said valve stem at the notched portion thereof.

2. An attachment for use on a notched valve stem, said attachment comprising a body having a thrust wall and a spring receiving flange, a rigid thrust member within and movable with respect to said body, said thrust member having portions adapted to engage, respectively, the thrust wall of said body and the notch-forming walls of the valve stem, and means carried by said body for preventing the removal of said thrust member therefrom.

3. An attachment for use on a valve stem having opposed notches, said attachment comprising a shell having a thrust wall of spherical shape and a spring receiving flange, and a pair of rigid thrust members carried by said shell and having spherical surfaces conforming to the spherical inner surface of said shell, each of said members having a projection of the size and shape of a notch of the valve stem.

4. An attachment for use on a notched valve stem, said attachment comprising a shell having a thrust wall, and a pair of thrust members carried by said shell, and having surface portions conforming to the shape of said thrust wall, said members being of identical shape and forming a split tube having an inner cylindrical surface broken by surfaces defining projections of the size and shape of the notches of the valve stem.

5. An attachment for use on a notched valve stem, said attachment comprising a shell having an apertured thrust wall and a flange, rigid thrust members within said shell and movable into position between said thrust wall and the notch-forming surfaces of a valve stem, and spring means within said shell urging said thrust members towards the aforesaid position.

6. An attachment for use on a notched valve stem, said attachment comprising a shell having a spherical thrust wall at one end and a spring-receiving flange at the opposite end, thrust members having spherical surfaces at one end thereof and having lugs engageable in the notches of a stem, a spring support carried by the flanged end of said shell, and a spring between said support and said thrust members for urging the same towards said thrust wall.

VINCENT LEO SCHENK.